No. 888,853. PATENTED MAY 26, 1908.
C. E. SHADE.
AIR BRAKE.
APPLICATION FILED DEC. 3, 1907.

2 SHEETS—SHEET 1.

Witnesses
Frederic Shaw
J. E. Marye

Inventor
Charles E. Shade
By
P. J. Elliott
Attorney

No. 888,853. PATENTED MAY 26, 1908.
C. E. SHADE.
AIR BRAKE.
APPLICATION FILED DEC. 3, 1907.

2 SHEETS—SHEET 2.

Witnesses
Frederic Shaw
F. E. Marye.

Inventor
Charles E. Shade
By
T. I. Elliott
Attorney

UNITED STATES PATENT OFFICE.

CHARLES E. SHADE, OF TACOMA, WASHINGTON.

AIR-BRAKE.

No. 888,853. Specification of Letters Patent. Patented May 26, 1908.

Application filed December 3, 1907. Serial No. 404,938.

*To all whom it may concern:*

Be it known that I, CHARLES E. SHADE, a citizen of the United States of America, residing at Tacoma, in the county of Pierce and State of Washington, have invented certain new and useful Improvements in Air-Brakes, of which the following is a specification, reference being had therein to the accompanying drawing.

This invention relates to air brakes for railways and has for its object to automatically apply the brakes to the train when the air pressure in the main braking system has been lowered to such an extent that it no longer has sufficient power to properly apply the brakes.

A further object is to prevent the releasing of the brakes until the pressure in the main braking system has been pumped up to its normal working point.

Figure 1:
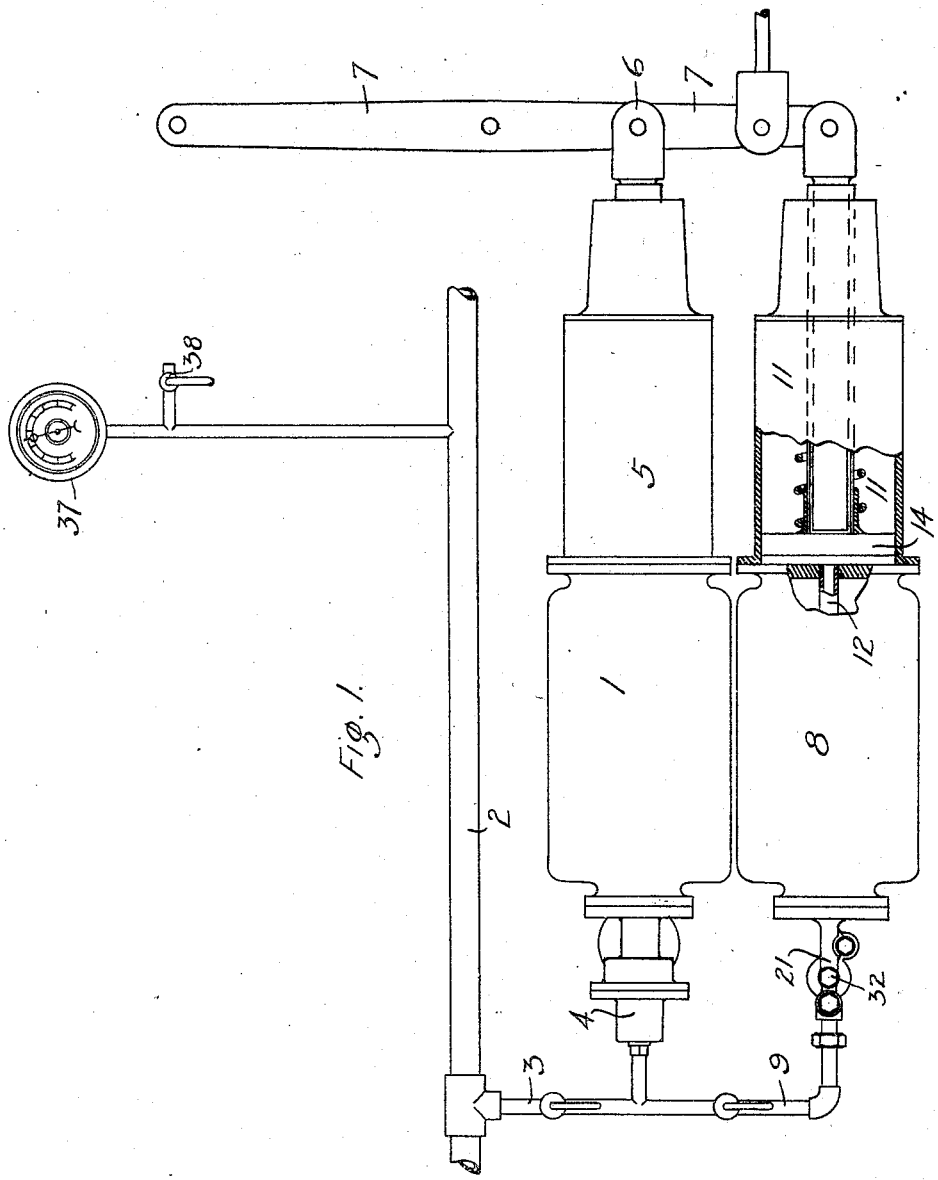
Figure 2:
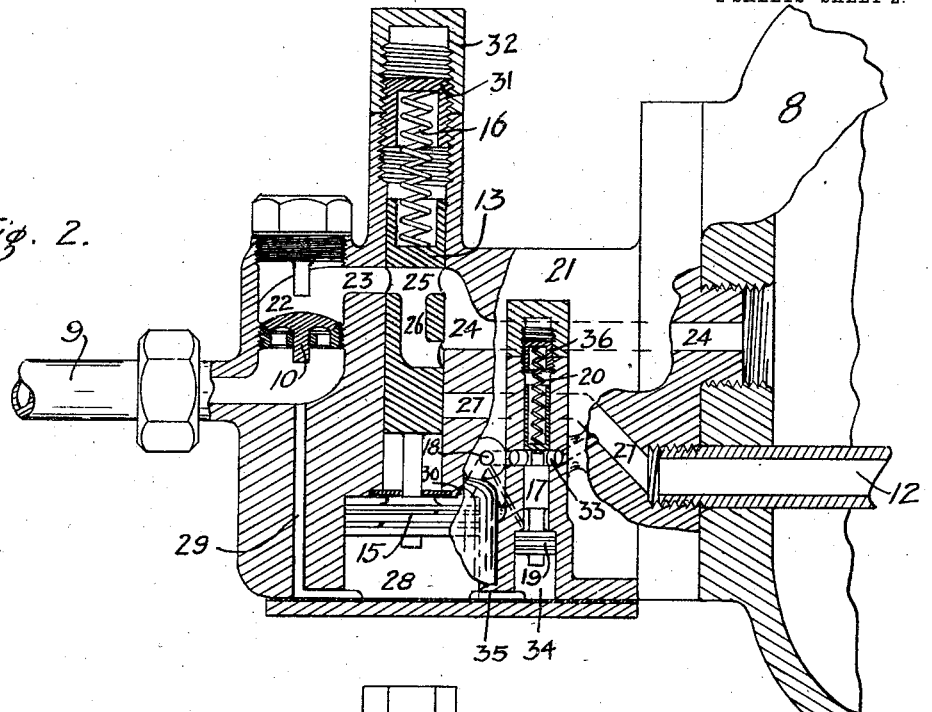
Figure 3:
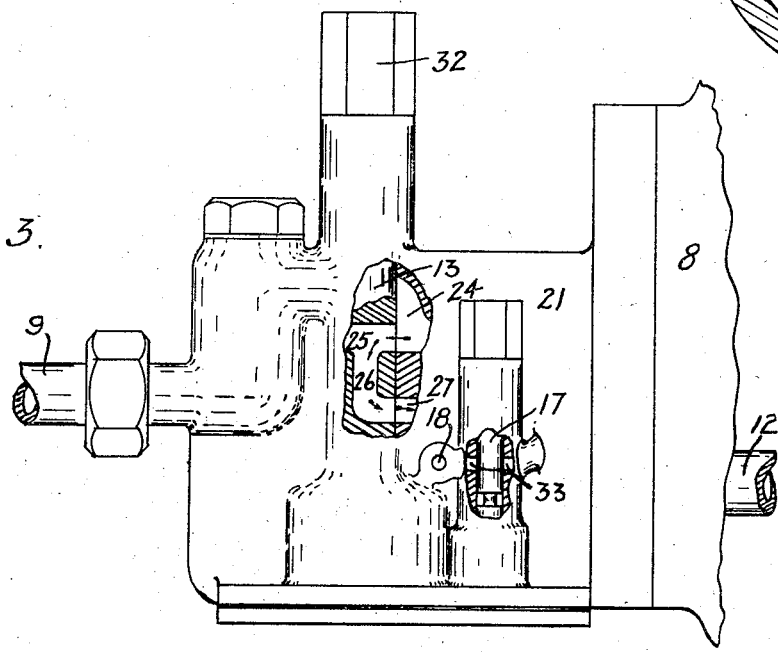

I attain these objects by the devices, mechanisms and arrangements illustrated in the accompanying drawings, in which Figure 1 is a plan showing my emergency brake mechanism connected to the cylinder lever of the braking system of a car; Fig. 2 is a longitudinal vertical section of the valves controlling my emergency brake shown in their normal or inoperative position; and Fig. 3, is a side elevation thereof, with parts broken away to show the valves in their operative positions.

Similar numerals of reference refer to similar parts throughout the several views.

The present air brake systems depend on the air pressure in the train-pipe and auxiliary reservoirs to apply the brakes on the train and one of the principal causes of the failures of the air brakes is found in the fact that the pressure in the reservoirs may become sufficiently low to render the brake system worthless so that it becomes necessary to apply the brakes by hand, and unless they are so applied in plenty of time it is impossible to stop the train if it is on a down grade. This lack of air pressure may be caused either through the inexperience of the engineer, or through negligent misunderstanding between the engineers of the hauling and boosting engines, or through gradual leakage of the air from the system on a long up grade haul. Another circumstance causing the lack of working air pressure is sometimes found when a train has been stopped several times on a long down grade stretch and then, before the air pressure can again be pumped up to the normal working pressure, an unexpected danger signal may be met with, and the air pressure may not be sufficient to stop the train within the distance desired. In order to overcome this defect in the present systems I apply an additional brake cylinder and reservoir to the present system, the said additional brake cylinder being inactive so long as the pressure in the main braking system is sufficient to operate the brakes, but which will immediately apply the full braking power of the train as soon as the air pressure becomes so low as to render the main braking system inoperative.

In general my invention may be said to consist of an extra, or emergency, auxiliary reservoir and brake cylinder, similar to those in use in the main braking system and applied to the cylinder lever of the brake system as near as possible to the point where the main braking piston is connected; the pressure in the said emergency reservoir being maintained at the maximum pressure in the train pipe; a valve controlled by the pressure in the train pipe and normally kept closed thereby but adapted to open under the action of a suitable spring when the pressure in the train pipe has been reduced to a predetermined point (say 10 pounds per square inch), and when it is thus opened the full pressure in the emergency reservoir is conducted to the emergency brake cylinder and the brakes are applied; and a valve which is also controlled by the air pressure in the train pipe but which controls the exhaust from the emergency brake cylinder so that the exhaust passage therefrom is kept closed unless the pressure in the train pipe exceeds a predetermined point (say 60 pounds per square inch).

Referring now to the drawings, the main auxiliary reservoir 1 is connected to the train pipe 2 by a pipe 3 which leads to the ordinary triple valve 4 which controls the connection between the reservoir 1 and the brake cylinder 5. The head 6 of the piston rod of this brake cylinder 5 is connected in the usual manner to the cylinder lever 7 of the braking system of the car. These parts are the same as are ordinarily in use and form the main braking apparatus of the car, in that they are normally used to the exclusion of the additional emergency apparatus which I am now about to describe. This emergency apparatus consists of a reservoir 8 connected to the train pipe 2 by a pipe 9, which may lead directly thereto or to the pipe 3; a drop valve 10, or other similar check valve, which will prevent the back flow of air from the reservoir 8 to the pipe 2 when the pressure therein is less than in the reservoir; a brake cylinder 11, having a pipe 12 leading thereto from the controlling valve 13, and having a piston 14 therein adapted to operate in the usual manner on the cylinder lever 7; the said controlling valve 13 being operated by the air pressure from the pipe 9 on a small piston 15 against the action of a spring 16, in such a manner that when the pressure on the piston exceeds about ten pounds per square inch the connection between reservoir 8 and the cylinder 11 is cut off, but is established if the pressure is below the said amount; and a valve 17 controlling the connection between the said pipe 12 and the exhaust outlet 18, and operated by the air pressure from the pipe 9 on the small piston 19 against the action of the stiff spring 20, in such a manner that the said connection is shut off if the air pressure on the piston is less than about sixty pounds per square inch, but is established if the pressure is above the said amount.

I have so arranged the valves that they are mounted in one body or casting 21 which may be applied to the reservoir or to the brake cylinder in a manner exactly similar to the usual triple valve, but I do not confine myself to this arrangement or to the form and shape of the valves as hereinafter described.

The pipe 9 is connected to the casting 21 by any suitable means and leads the air to a cavity 22 therein in which the drop valve 10 is suitably mounted and seated to prevent the return of air to the pipe 9. A passage 23 leads from the cavity 22 to the main valve 13 and a passage 24 leads from the valve 13 to the reservoir 8, the connection between the passages 23 and 24 being controlled by the valve 13 through which a passage 25 passes adapted to connect the said passages 23 and 24 when the valve is in its uppermost position. Another passage 26, connected with the passage 25, is formed in the valve 13 and is adapted to connect the passage 24 from the reservoir with the passage 27 when the said valve 13 is in its lowermost position, the said passage 27 leading to the pipe 12 and thus to the brake cylinder 11. The valve 13 is mounted on, or connected to a piston 15 working in a cylinder 28 formed in the casting 21, an air passage 29 leading from the cavity 22 to the lower end of said cylinder 28. The upper side of the cylinder 28 is in open communication with the air through the passage 30 leading to the exhaust outlet 18. The valve 13 is free to move vertically but does not rotate on its axis. The spring 16 is compressed between the valve 13 and an adjusting cap 31 screwed into the casting 21, above the valve 13, so that the pressure of the spring on the valve may be regulated. A protecting cap 32 is screwed on the adjusting cap 31. Within the same casting 21 is mounted the exhaust valve 17 which opens or closes the air exhaust passage 33 leading from the passage 27 to the exhaust outlet 18. The piston 19, which operates this valve, works in a cylinder 34 formed in the casting 21. A passage 35 leads from the lower end of the cylinder 28 to the lower end of the cylinder 34 thus connecting the latter cylinder also with the cavity 22 and with the air pressure in the train pipe. The spring 20 is much stiffer than the spring 16 but is similarly mounted between the valve 17 and the adjustable cap 36. An air passage leads from the upper end of the cylinder 34 to the exhaust outlet 18. A pressure gage 37 is mounted in each car and an air cock 38 is mounted adjacent thereto, both being connected to the train pipe 2.

My device operates in the following manner. So long as the main braking system is sufficient to control the train the valve 13 keeps in the position shown in Fig. 2 so that if the air pressure in the reservoir 8 is about sixty-five pounds per square inch while the pressure in the train pipe is seventy pounds then the valve 10 will open and will admit further compressed air thereinto until the two pressures are equal then the valve will close and will retain the pressure in the reservoir 8 until the pressure in the train line again exceeds that in the reservoir; thus the pressure in the reservoir is always equal to the maximum pressure in the train line. Now if for any reason there has been a waste of air from the main braking system and an emergency stop must be made then the engineer, or the conductor, may drain the train pipe 2 until the pressure therein is less than about ten pounds per square inch, then the spring 16 forces the valve 13 down and connects the reservoir 8 to the brake cylinder 11 through the passages, 24, 25, 26, 27 and 12 thus applying the air pressure in the emergency apparatus on the brakes which however have been already set, but with insufficient power, by the main braking apparatus; and since the pressure in the cylinder 34 is less than sixty pounds per square inch, the exhaust from the brakes is cut off so that the train cannot be started again until the train pipe and all the auxiliary and emergency reservoirs have been pumped up again to about sixty pounds, when the valve 17 will open the passage 33 and allow the air to escape from the cylinder 11 through the passages 12, 33 and the outlet 18. It is evident that this emergency brake can be operated purposely by the engineer, or the conductor may open the cock 38 if he sees that the air gage 37 shows too low an air pressure for safe operation, or it can operate automatically independently of either the engineer or conductor.

Having now described my invention what I claim is,

1. An air brake, having a source of compressed air and means for the distribution thereof, a reservoir in connection therewith, a brake cylinder with piston therein in connection with the braking system of the car, a triple valve controlling the connection between the source of compressed air and the reservoir, and between the reservoir and the brake cylinder, and between the brake cylinder and the exhaust, and controlled by the difference in the air pressure in the reservoir and the distributing means; in combination with an emergency reservoir, connected to the distributing means; a check valve within said connection whereby the air can flow only from the distributing means to the reservoir; an emergency brake cylinder with piston therein in connection with the braking system of the car; a valve controlling the connection between the emergency reservoir and the emergency brake cylinder and operated by the difference in pressures exerted thereon by the air in the distributing means and by an adjustable spring and adapted to open said connection when the said air pressure is less than a predetermined amount; and a valve controlling the exhaust from said emergency brake cylinder and operated by the difference in pressures exerted by the air in the distributing means and by an adjustable spring and adapted to open the exhaust passage when the said air pressure is greater than a predetermined amount.

2. In an air brake, the combination with a main braking system, comprising a source of compressed air and means for the distribution thereof, mechanical means for supplying the pressure of the air to the brakes, and means for controlling said mechanical means; of an emergency reservoir supplied with compressed air from the distributing means; a check valve controlling the connection between the distributing means and the reservoir whereby the air can flow only from the distributing means to the reservoir; mechanical means for applying the pressure of the air in said emergency reservoir to the brakes; and means for controlling said mechanical means.

3. In an air brake, the combination with a main braking system, comprising a source of compressed air and means for the distribution thereof, mechanical means for applying the pressure of the air to the brakes, and means for controlling said mechanical means; of an emergency reservoir holding compressed air therein; an emergency brake cylinder with mechanical means for applying the pressure of the air from said emergency reservoir to the brakes; and a valve controlling the connection between the emergency reservoir and the emergency brake cylinder and controlled by the air pressure in the distributing means whereby the connection is opened when the air pressure falls below a predetermined amount.

4. In an air brake, the combination of a source of compressed air and means for the distribution thereof, a reservoir in connection with the distributing means, a brake cylinder with mechanical means for applying the pressure of the air from the reservoirs to the brakes, a valve controlling the connection between the reservoir and the brake cylinder, a cylinder with piston therein connected to the said valve, one end of the cylinder being connected to the distributing means and the other end being open to the exhaust, and a spring engaging said valve to counteract the pressure of the air on the piston whereby said valve is moved by the difference in the pressures exerted thereon by the spring and by the air in the distributing means.

5. In an air brake having an air distributing system, a reservoir and brake cylinder, the combination of a valve controlling the connection between the reservoir and the brake cylinder, a cylinder with piston therein connected to said valve, one end of the cylinder being connected to the air distributing system and the other end being open to the exhaust, a spring engaging said valve to counteract the pressure of the air on the piston whereby said valve is operated by the difference in pressure exerted by the air in the distributing system and by the spring, to open said connection when the air pressure is less than a predetermined amount, and an adjustable stop for said spring whereby its pressure on the valve may be adjusted.

6. In an air brake having an air distributing system and a brake cylinder, the combination of a valve controlling the exhaust of said brake cylinder, a cylinder with piston therein connected to said valve, one end of the cylinder being connected to the air distributing system and the other end being open to the exhaust, and an adjustable spring engaging said valve to counteract the pressure of the air on the piston whereby said valve is operated by the difference in pressures exerted thereon by the air in the distributing system and by the spring to open the exhaust of said brake cylinder when the air pressure in the distributing system is greater than a predetermined amount.

7. In an air brake having an air distributing system, a reservoir, and a brake cylinder, the combination of a valve controlling the connection between the reservoir and the brake cylinder, a cylinder with piston therein connected to said valve, one end of the cylinder being connected to the air distributing system and the other end being open to the exhaust, an adjustable spring engaging said valve to counteract the pressure of the air on the piston whereby said valve is operated by the difference in pressures exerted thereon by the air in the distributing system and by the spring, to open said connection when the air pressure is less than a predetermined amount, a valve controlling the exhaust of said brake cylinder, a cylinder with piston therein connected to said valve, one end of the cylinder being connected to the air distributing system and the other end being open to the exhaust, and an adjustable spring engaging said valve to counteract the pressure of the air on the piston whereby said valve is operated by the difference in pressures exerted thereon by the air in the distributing system and by the spring to open the exhaust of said brake cylinder when the air pressure in the distributing system is greater than a predetermined amount.

8. In an air brake having an air distributing system, a reservoir and a brake cylinder, the combination of a check valve between the distributing system and the reservoir to retain air pressure in said reservoir, a valve connecting the reservoir to the brake cylinder, means whereby the valve is operated to open said connection when the air pressure in the distributing system is less than a predetermined amount, a valve controlling the exhaust of the brake cylinder, and means whereby the valve is operated to exhaust the brake cylinder when the air pressure in the distributing system is greater than a predetermined amount.

In testimony whereof I affix my signature in presence of two witnesses.

CHARLES E. SHADE.

Witnesses:
F. B. CAMPBELL,
C. D. BALL.